Jan. 15, 1952   D. MacRAE, JR   2,582,596
PHASE DETECTOR CIRCUIT
Filed April 17, 1946

INVENTOR
DUNCAN MACRAE JR.
BY *M. C. Hayes*
ATTORNEY

Patented Jan. 15, 1952

2,582,596

UNITED STATES PATENT OFFICE 2,582,596

PHASE DETECTOR CIRCUIT

Duncan MacRae, Jr., Cambridge, Mass., assignor, by mesne assignments, to the United States of America as represented by the Secretary of the Navy Application April 17, 1946, Serial No. 662,684

3 Claims. (Cl. 172—245)

This invention relates to a phase detector and more particularly to a circuit which provides an output indication on a meter which is a function of the phase displacement between an alternating input voltage and a reference alternating voltage.

Circuits have been employed for detecting the phase of an input alternating voltage with respect to that of a reference voltage and registering said phase on an A. C. meter. These have been objectionable because any change in the circuit constants of such circuits resulted in inaccurate meter readings. The reason for this is that in such instruments there is a large amount of "zero shift" due to tube and other changes. By "zero shift" is meant a change in the position of the meter reading when no input alternating voltage is being received. Large zero shift in phase detectors heretofore constructed was a result of the large amount of current in the system when no signal was being received.

The general object of the present invention is to provide a phase detector circuit for alternating voltages having a low zero shift with respect to tube change.

Another object of the present invention is to provide a phase detector for alternating voltages having a high input impedance.

A further object is to provide a means of switching the current of a cathode follower between two cathode resistors.

A still further object is to accomplish said switching action by a reference voltage.

A still further object is to provide a meter in the cathode circuit of a cathode follower reading phase directly.

These and other objects will be apparent from the following specification when taken in connection with the accompanying drawing in which.

Broadly this invention involves the use of a D. C. meter operated by the cathode current of a cathode follower for providing direct reading of phase angle. The voltage to be phase detected relative to the phase of a reference voltage is applied to the grid of a cathode follower. The stable reference voltage, of the same frequency as the voltage to be tested, is applied in push-pull to the grids of two switch tube amplifiers. The output of the two amplifiers is used to control the current through the phase reading D. C. meter on alternate half cycles, and the D. C. meter is calibrated in terms of the phase of the input voltage relative to that of the reference voltage.

Figure 1:
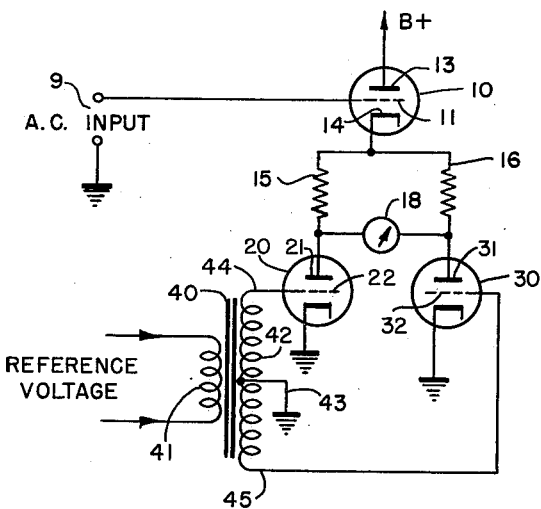
Fig. 1 is a schematic diagram of one form of the invention.

Referring to Fig. 1 the triode 10 is connected as a cathode follower. The input A. C. signal is applied at terminals 9 to the grid 11. The parallel resistors 15 and 16 are of equal value, and form part of the load for the cathode 14. The plate 13 of tube 10 obtains its voltage directly from B+. A conventional D. C. movable pointer meter 18 is connected between plates 21 and 31 of tubes 20 and 30; and thus, between cathode follower load resistors 15 and 16. Plates 21 and 31 obtain their voltage from the B+ supply through the effective resistance of tube 10 in series with the parallel resistors 15 and 16. The reference voltage is impressed upon the primary 41 of transformer 40. Center tap 43 grounds the center of secondary 42 of transformer 40, with the result that the voltages at ends 44 and 45 of secondary 42 are 180 degrees out of phase. The output of the secondary 42 is fed to grids 22 and 32 of tubes 20 and 30.

Figure 2:
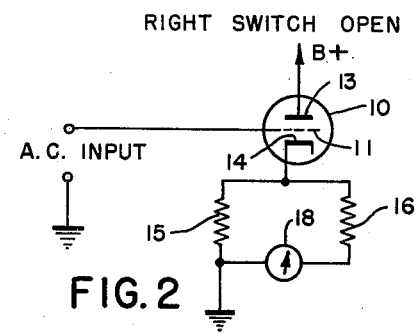
Fig. 2 is the equivalent circuit of Fig. 1.

Referring to Fig. 2, there is shown an equivalent circuit of Fig. 1, representing the period when tube 30 is cut off and tube 20 is conducting. The current path from resistor 16 to ground is through meter 18. Equal resistors 15 and 16 are effectively in parallel since D. C. meter 18 has negligible resistance. Therefore, half the plate current of tube 10 will flow through resistor 16 and in turn through meter 18.

Figure 3:
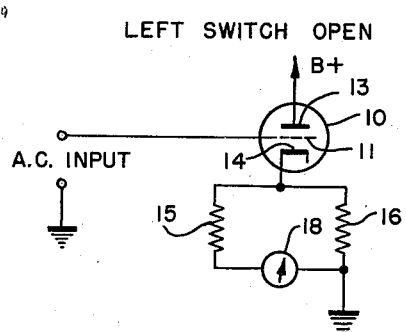
Fig. 3 is the equivalent circuit of Fig. 1 under different operating conditions.

Referring to Fig. 3, there is shown an equivalent circuit, similar to that shown in Fig. 2 except that tube 30 is conducting and tube 20 is cut off. Here again the current path from resistor 15 to ground is through meter 18. One half the plate current of tube 10 still flows through meter 18 but in opposite direction to that discussed for Fig. 2.

Wave form 51 represents an A. C. input signal that may be applied at terminals 9. In this example, the voltage represented by wave form 51 is in phase with reference voltage represented by wave form 50. Wave form 52 represents the resultant plate current of tube 10 with signal 51 applied at grid 11.

Wave form 53 represents a second A. C. input signal that may be applied at terminals 9. In this example, the voltage at terminals 9 is 180 degrees out of phase with the reference voltage. Wave form 54 represents the resultant plate current of tube 10 with the signal of wave form 53 applied to grid 11.

Figure 4:
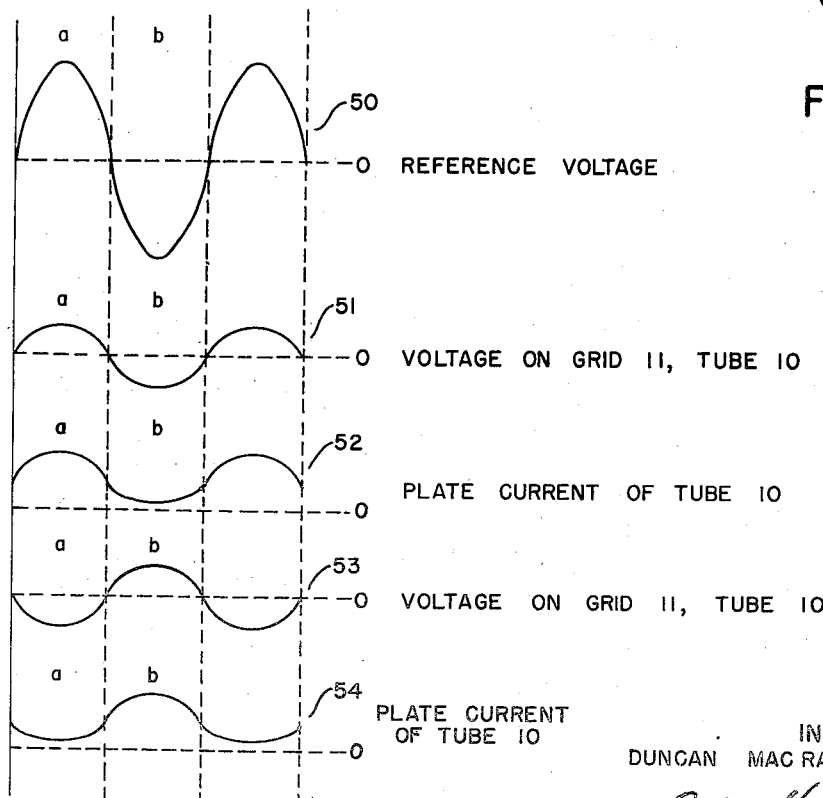
Fig. 4 is a number of wave forms taken at various points of Fig. 1.

In operation, when reference voltage 50 (Fig. 4) is applied to the primary 41 of transformer 40 (Fig. 1), the voltages appearing at points 44 and 45 at the ends of secondary 42 are out of phase by 180 degrees. Therefore, there is impressed on grids 22 and 32 of tubes 20 and 30 a voltage varying sinusoidally from a high positive value, sufficient to cause either tube to conduct strongly, to a low negative value, sufficient to cut either tube off. Since it has been shown that voltages at grids 22 and 32 are 180 degrees out of phase, on one half cycle of reference voltage 50 tube 20 will conduct and tube 30 will be cut off. During the next half cycle tube 30 will conduct and tube 20 will be cut off.

Assume now that the signal represented by wave form 51, which is in phase with and at the same frequency as the reference voltage 50, is applied to grid 11. The resultant plate current 52 will also be in phase with the above-mentioned two voltages. During the positive swing of the voltage 51, the tube 10 (Fig. 1) will conduct heavily as shown by part $a$ of wave form 52. During the negative swing of wave form 51 the grid to cathode signal of tube 10 is decreased with the result that the plate current flowing during part $b$ of wave form 52 is substantially less than the current flowing during part $a$. If the signal applied to terminals 9 is of sufficient amplitude, tube 10 may be completely cut off during part of the negative half cycle [part $b$] of wave form 51. As a result, the wave form 52 will go to zero during this portion of the cycle but, as will be seen presently, this will in no way affect the operation of the circuit of Fig. 1.

The above-described operation of tube 10 corresponds exactly to the normal operation of a cathode follower circuit and is well known to workers in the electronics art.

It has been demonstrated that Fig. 2 is the equivalent circuit of Fig. 1 during part $a$ of wave form 50 since tube 20 is conducting and tube 30 is cut off during this half cycle. Current flow will be from resistor 16 through meter 18 to ground. Meter 18 is preferably so constructed as to have its movable pointer at center scale when no current flows therethrough. When current is flowing in the above mentioned direction the meter is deflected to the right. During the second half of the cycle of Fig. 3 is the equivalent circuit of Fig. 1 (since tube 30 is conducting and tube 20 is cut off). This time the flow of current is from resistor 15 through meter 18 to ground and meter 18 is deflected to the left. Since meter 18 is a D. C. meter it will only indicate the average current of the complete cycle. The current flowing through meter 18 during the half-cycle $a$ is proportional to the area between wave form 52 and the zero axis during part $a$ of wave form 52. The current flowing through meter 18 in the reverse direction during part $b$ of wave form 52 is proportional to the area between wave form 52 and the zero axis during the half-cycle $b$. Referring to wave form 52 (Fig. 4) it can be clearly seen that more plate current will flow during the first half cycle than during the second and the resultant meter deflection will be to the right.

The plate current resulting from the input voltage 53 which is 180 degrees out of phase with the reference voltage 50 is shown in wave form 54. This time there is a greater current during the second half of the cycle (part $b$) than during the first half (part $a$). The resultant meter deflection is to the left.

There has been thus established a means of calibrating meter 18 in terms of the phase of any alternating voltage of the same frequency as the reference voltage. If the phase is the same as that of the reference voltage the meter will be deflected to the right. If no signal is being received the meter will be in the center. If the phase is 180 degrees away from the reference voltage the meter 18 will be deflected to the left. The zero position of the meter is not a critical function of the circuit constants (such as tubes, resistors, etc.) because very little current flows through the meter 18 when no signal is received.

While a particular embodiment of this invention has been disclosed and described, it is to be understood that various changes and modifications may be made therein without departing from the spirit and scope thereof as set forth in the appended claims.

What is claimed is:

1. A phase detector circuit comprising an electron tube having at least a grid, a cathode and an anode, said anode being connected to a point of fixed positive potential, first and second voltage operated switch means, each switch means having a conducting state and a non-conducting state, first resistive means connecting said cathode to a point of fixed reference potential through said first switch means, second resistive means connecting said cathode to said point of reference potential through said second switch means, a direct-current meter connected between said ends of said resistor means remote from said cathode, means connecting a periodic voltage to said switch means whereby one of said switch means is in a said conductive state while the other of said switch means is in said non-conductive state and whereby said switch means alternate between said conductive state and said non-conductive state, the characteristics of said switch means being substantially independent of the characteristics of said periodic voltage when in either of said two states, and means for coupling an input signal to said control grid whereby said meter provides an indication of the relative phase of said input signal and said periodic voltage.

2. A phase detector circuit comprising, a first, a second, and a third electron tube each having at least an anode, a cathode, and a control grid, said first and second electron tubes having their cathodes connected to a point of fixed reference potential, said third electron tube having its anode connected to a point of positive potential, first resistive means connecting said cathode of said third electron tube to said anode of said first electron tube, second resistive means connecting said cathode of said third electron tube to the anode of said second electron tube, a direct-current meter connected between the anode of said first electron tube and the anode of said second electron tube, a source of periodic reference voltage, means for applying said reference voltage to said grid of said first electron tube in a first phase, means for applying said reference voltage to the grid of said second electron in a phase opposite to said first phase, and means for applying an input signal to said grid of said third electron tube whereby said meter provides an indication of the relative phase of said input signal and said reference voltage.

3. A phase detector circuit comprising, a first, a second, and a third electron tube each having at least an anode, a cathode, and a control grid, said first and second electron tubes having the cathodes thereof connected to a point of fixed reference potential, said third electron tube having the anode thereof connected to a point of fixed positive potential, first resistance means connecting said cathode of said third electron tube to said anode of said first electron tube, second resistive means connecting said cathode of said third electron tube to said anode of said second electron tube, a direct-current meter connected from said anode of said first electron tube to said anode of said second electron tube, a transformer having a primary and a secondary winding, said secondary winding having a plurality of terminals thereon, means connecting selected terminals of said secondary winding to said grid of said first electron tube, said grid of said second electron tube and said point of reference potential whereby a reference signal coupled to said primary winding is applied to said control grid of said first electron tube in phase opposition to the corresponding signal applied to said control grid of said second electron tube, and means for applying an input signal to said grid of said third electron tube whereby said meter provides an indication of the relative phase of said input signal and said reference signal.

DUNCAN MacRAE, Jr.

REFERENCES CITED

The following references are of record in the file of this patent:

UNITED STATES PATENTS

| Number | Name | Date |
| --- | --- | --- |
| 2,250,708 | Herz | July 29, 1941 |
| 2,394,892 | Brown | Feb. 12, 1946 |